(12) United States Patent
Eguchi et al.

(10) Patent No.: US 8,105,503 B2
(45) Date of Patent: Jan. 31, 2012

(54) METHOD OF STORING THERMORESPONSIVE POLYMER IN STATE OF AQUEOUS SOLUTION

(75) Inventors: Masaru Eguchi, Chiba (JP); Noriyuki Ohnishi, Chiba (JP)

(73) Assignee: Chisso Corporation, Osaka (JP)

( * ) Notice: Subject to any disclaimer, the term of this patent is extended or adjusted under 35 U.S.C. 154(b) by 0 days.

(21) Appl. No.: 13/149,545

(22) Filed: May 31, 2011

(65) Prior Publication Data

US 2011/0233453 A1    Sep. 29, 2011

Related U.S. Application Data

(62) Division of application No. 12/147,269, filed on Jun. 26, 2008, now Pat. No. 7,976,728.

(30) Foreign Application Priority Data

Jun. 29, 2007 (JP) ................. 2007-173464

(51) Int. Cl.
*C08F 20/54* (2006.01)
*C08F 6/06* (2006.01)

(52) U.S. Cl. ............. 252/380; 524/555; 526/303.1

(58) Field of Classification Search ........... 252/380; 524/555; 526/303.1
See application file for complete search history.

(56) References Cited

U.S. PATENT DOCUMENTS 6,956,077 B1   10/2005   Akiyama et al. .......... 435/4

FOREIGN PATENT DOCUMENTS

| EP | 1 312 627 | 5/2003 |
|----|-----------|--------|
| EP | 1 315 599 | 6/2003 |

OTHER PUBLICATIONS

D. N. Schulz et al., "Phase Behaviour and solution properties of sulphobetaine polymers" Polymer, (1986), vol. 27, pp. 1734-1742.
Hideo Yamauchi et al., "LCST and UCST Behavior of Poly(N-isopropylacrylamide) in DMSO/Water Mixed Solvents Studied by IR and Micro-Raman Spectroscopy" Journal of Physical Chemistry B., (2007), vol. 111, pp. 12964-12968.
Akihiko Kondo et al., "Development and application of thermo-sensitive magnetic immunomicrospheres for antibody purification" Applied Microbiology Biotechnology, (1994), vol. 41, No. 1, pp. 99-105.
Akihiko Dondo et al., "Preparation of Thermo-Sensitive Magnetic Hydrogel Microspheres and Application to enzyme Immobilization" Journal of Fermentation and Bioengineering, (1997), vol. 84, No. 4, pp. 337-341.
Ricardo O.R. Costa et al., "Phase behavior of poly(N-isopropylacrylamide) in binary aqueous solutions" Polymer, (2002), vol. 43, Issue 22, pp. 5879-5885.
Norihiro Kato et al., "Effect of Alkali Metal Halides on the Upper Critical Solution Temperature of Poly(N-acetylacrylamide) in Ethanol-Water System" Analytical Sciences, (2001), vol. 17, pp. i1133-i1136.

*Primary Examiner* — David W Wu
*Assistant Examiner* — Vu A Nguyen
(74) *Attorney, Agent, or Firm* — J.C. Patents

(57) ABSTRACT

It is intended to provide an aqueous solution of a thermoresponsive polymer, which shows an upper critical solution temperature (UCST) and is capable of maintaining a dissolved state, even if it is stored for a long period of time at a temperature at which a ligand such as an antibody or an antigen is not inactivated. A UCST lowering agent is incorporated in a predetermined amount in an aqueous solution of a thermoresponsive polymer which shows a UCST in a state of containing water, thereby lowering the UCST of the aqueous solution to less than the storage temperature, and the resulting aqueous solution is stored.

7 Claims, 1 Drawing Sheet

METHOD OF STORING THERMORESPONSIVE POLYMER IN STATE OF AQUEOUS SOLUTION

CROSS-REFERENCE TO RELATED APPLICATION

This application is a divisional application of and claims the priority benefit of application Ser. No. 12/147,269 filed on Jun. 26, 2008, which claimed the priority benefit of Japanese application serial no. JP2007-173464 filed on Jun. 29, 2007 and has been allowed. The entirety of the above-mentioned patent application is incorporated by reference herein and made a part of this specification.

BACKGROUND OF THE INVENTION

1. Field of the Invention

The present invention relates to an aqueous solution of a polymer having an upper critical solution temperature, an aqueous dispersion of a particle modified with the polymer and a method of storing the same.

2. Background Art

As a polymer composition showing thermoresponse, a stimulus-responsive magnetic particle obtained by immobilizing polyisopropyl acrylamide, showing a lower critical solution temperature (hereinafter referred to as "LCST") in a state of an aqueous solution, on a magnetic particle having a particle size of about 100 to 200 nm is known (see, for example, Appl. Microbiol. Biotechnol., vol. 41, pp. 99-105, 1994 (Non-patent document 1), and Journal of Fermentation and Bioengineering, vol. 84, pp. 337-341, 1997 (Non-patent document 2)).

Such a stimulus-responsive magnetic particle is well dispersed in water because it has a particle size of about 100 to 200 nm and is very small. In the case where an aqueous solution of such stimulus-responsive magnetic particles is heated to a temperature not lower than the LCST, the stimulus-responsive magnetic particles aggregate. Since the resulting aggregate can be easily collected by a magnetic force, an attempt has been made to perform separation of various biomolecules or microorganisms using stimulus-responsive magnetic particles on which an antibody or an antigen has been immobilized.

However, in the case of performing separation of a biomolecule or the like using the above-mentioned method, the both temperatures of the target substance and a solution containing the stimulus-responsive magnetic particles are required to be raised to a temperature not lower than the LCST. Therefore, the biomolecules or the like as the target substance may sometimes be damaged or inactivated depending on the LCST of the stimulus-responsive magnetic particles to be used or the thermostability of the target substance.

As another polymer composition showing thermoresponse, a polymer showing an upper critical solution temperature (hereinafter also referred to as "UCST") in a state of an aqueous solution and a thermoresponsive microparticle obtained by immobilizing this polymer on a carrier particle is known (see, for example, JP-A-2000-086729 (Patent document 1), WO 02/016454 (Patent document 2), and JP-A-2005-082538 (Patent document 3)). In the case where such a thermoresponsive microparticle on which a polymer showing a UCST has been immobilized is used for separation of a biomolecule or the like, the biomolecule or the like as the target substance can be separated and collected without damaging or inactivating the target substance due to heating.

In the case where the above-mentioned thermoresponsive microparticle is used for separation of a biological sample, in order to perform separation of various biomolecules or microorganisms, an antibody or an antigen has been immobilized as a ligand on the thermoresponsive microparticle in many cases. In order to prevent damage or inactivation of such a ligand, the thermoresponsive microparticle is generally stored at a low temperature in the range of from 0° C. to 10° C. However, in many cases, a polymer showing UCST in the range of from 0° C. to 10° C. is used, though depending on the type of thermoresponsive microparticle, therefore, when it is stored at a low temperature, the polymer is to be maintained in an aggregated state. When the polymer is maintained in an aggregated state for a long period of time (for example, for 1 month), even if the temperature is raised to the UCST or higher, the thermoresponsive microparticle may not disperse or it may take time to disperse in some cases.

SUMMARY OF THE INVENTION

Accordingly, the present invention provide an aqueous solution of a thermoresponsive polymer and an aqueous dispersion of a thermoresponsive particle, which show a UCST and are capable of maintaining a dissolved state and a dispersed state, respectively, even if they are stored for a long period of time at a temperature at which a ligand such as an antibody or an antigen is not inactivated, and a method of storing the same.

The present inventors made intensive studies in order to solve the above-mentioned problem, and as a result, they found that in the case where a polymer showing a UCST is stored in a state of an aqueous solution, when the polymer is stored in a dissolved state by adding a specific salt or water-soluble organic solvent in a predetermined amount thereby lowering the UCST to less than a storage temperature, the dissolved state of the polymer is maintained even if it is stored for a long period of time; and in the case where a particle modified with a polymer showing a UCST is stored in water, when the particle is stored in such a state that the UCST is lowered to less than a storage temperature in the same manner as the case of the polymer, the dispersed state of the particle is maintained without inactivating a ligand such as an antibody or an antigen even if it is stored for a long period of time. Thus, the present invention has been completed based on these findings.

That is, the present invention is as follows.

[1] A method of storing a thermoresponsive polymer in a state of an aqueous solution, wherein the aqueous solution of the thermoresponsive polymer containing a thermoresponsive polymer is stored at a storage temperature, said storage temperature is less than an upper critical solution temperature, and the thermoresponsive polymer has said upper critical solution temperature according to a composition of the aqueous solution, the method comprises the step of adding to the aqueous solution an upper critical solution temperature lowering agent, which lowers the upper critical solution temperature, in an amount so that the upper critical solution temperature is lowered to less than the storage temperature, to lower the upper critical solution temperature to less than the storage temperature.

[2] A method of storing a thermoresponsive particle in a state of an aqueous dispersion, wherein the aqueous dispersion of the thermoresponsive particle containing a thermoresponsive particle, having a carrier particle and a thermoresponsive polymer carried on the carrier particle, is stored at a storage temperature, said storage temperature is less than an upper critical solution temperature, and the thermoresponsive particle has said upper critical solution temperature due to the thermoresponsive polymer according to a composition of the aqueous dispersion, the method comprises the step of adding to the aqueous dispersion an upper critical solution temperature lowering agent, which lowers the upper critical solution temperature, in an amount so that the upper critical solution temperature is lowered to less than the storage temperature, to lower the upper critical solution temperature to less than the storage temperature.

[3] The storage method according to [1] or [2], wherein the thermoresponsive polymer is a polymer obtained by polymerization or copolymerization of a monomer containing one or both of N-acryloylglycinamide and N-acryloylasparaginamide as a principal component.

[4] The storage method according to [3], wherein the thermoresponsive polymer is a polymer obtained by polymerization or copolymerization of a monomer containing 90% by mole or more in total of one or both of N-acryloylglycinamide and N-acryloylasparaginamide.

[5] The storage method according to any one of [1] to [4], wherein the storage temperature is from 2 to 6° C.

[6] The storage method according to [5], wherein the upper critical solution temperature lowering agent is sodium chloride, sodium nitrate, magnesium sulfate, lithium chloride or dimethyl sulfoxide.

[7] The storage method according to [6], wherein the upper critical solution temperature lowering agent is sodium chloride, sodium nitrate, magnesium sulfate or lithium chloride, and is added to the aqueous solution or aqueous dispersion at a concentration of 1,000 mM or more.

[8] The storage method according to [6], wherein the upper critical solution temperature lowering agent is sodium chloride, sodium nitrate or magnesium sulfate, and is added to the aqueous solution or aqueous dispersion at a concentration of 450 mM or more.

[9] The storage method according to [6], wherein the upper critical solution temperature lowering agent is dimethyl sulfoxide, and is added to the aqueous solution or aqueous dispersion at a concentration of 60% by volume or more.

[10] The storage method according to [2], wherein the carrier particle is a magnetic particle.

[11] The storage method according to [10], wherein the particle size of the thermoresponsive particle is from 50 to 200 nm.

[12] The storage method according to [10] or [11], wherein the thermoresponsive particle further has a ligand carried on the thermoresponsive polymer.

[13] An aqueous solution of a thermoresponsive polymer, comprising a polymer obtained by polymerization or copolymerization of a monomer containing 90% by mole or more in total of one or both of N-acryloylglycinamide and N-acryloylasparaginamide; water; and any one of 450 mM or more of sodium chloride, 450 mM or more of sodium nitrate, 450 mM or more of magnesium sulfate, 1,000 mM or more of lithium chloride and 60% by volume or more of dimethyl sulfoxide.

[14] The aqueous solution according to [13], wherein the concentration of sodium chloride, sodium nitrate, magnesium sulfate or lithium chloride is 5 M or less.

[15] An aqueous dispersion of a thermoresponsive particle, comprising: a thermoresponsive particle having a carrier particle and a polymer obtained by polymerization or copolymerization of a monomer containing 90% by mole or more in total of one or both of N-acryloylglycinamide and N-acryloylasparaginamide and carried on the carrier particle; water; and any one of 450 mM or more of sodium chloride, 450 mM or more of sodium nitrate, 450 mM or more of magnesium sulfate, 1,000 mM or more of lithium chloride and 60% by volume or more of dimethyl sulfoxide.

[16] The aqueous dispersion according to [15], wherein the carrier particle is a magnetic particle.

[17] The aqueous dispersion according to [16], wherein the particle size of the thermoresponsive particle is from 50 to 200 nm.

[18] The aqueous dispersion according to [16] or [17], wherein the thermoresponsive particle further has a ligand carried on the polymer.

[19] The aqueous dispersion according to any one of [15] to [18], wherein the concentration of sodium chloride, sodium nitrate, magnesium sulfate or lithium chloride is 5M or less.

DETAILED DESCRIPTION OF THE INVENTION

Figure 1:
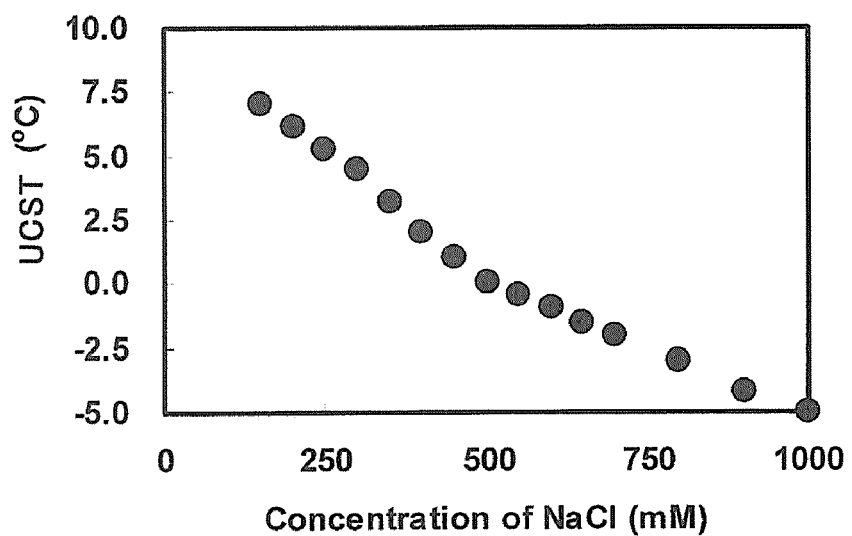
FIG. 1 is a graph showing a relationship between the UCST of an aqueous solution obtained by dissolving a thermoresponsive polymer 1 in a sodium chloride aqueous solution in an amount of 0.1% by weight and the concentration of sodium chloride when the concentration of sodium chloride was changed.

The upper critical solution temperature (UCST) of the thermoresponsive polymer as used herein refers to a temperature when an aqueous solution of the thermoresponsive polymer containing the thermoresponsive polymer is prepared to have a desired composition in a clear (dissolved) state (a state of an aqueous solution), if necessary by heating, subsequently, the temperature of the resulting aqueous solution of the thermoresponsive polymer is lowered at a rate of 1° C. per minute, and the visible light transmittance of the aqueous solution of the thermoresponsive polymer becomes 50% (a state in which the thermoresponsive polymer aggregates) of the value in the clear state.

The thermoresponsive polymer as used herein refers to a polymer which shows a UCST in a state of an aqueous solution. The thermoresponsive polymer aggregates from an aqueous solution at the UCST or less, and dissolves at a temperature higher than the UCST. It is preferred that a difference between a temperature at which the thermoresponsive polymer dissolves and the UCST is smaller, and a thermoresponsive polymer that dissolves in water at a temperature ranging from the UCST to a temperature higher than the UCST by 10° C. is preferred, and a thermoresponsive polymer that dissolves in water at a temperature ranging from the UCST to a temperature higher than the UCST by 5° C. is more preferred.

The composition of the aqueous solution of the thermoresponsive polymer as used herein refers to the total components contained in the aqueous solution including the thermoresponsive polymer and water, and a ratio of the components. This is because the value of UCST may be changed due to an effect of a coexisting substance contained in the aqueous solution. The above-mentioned desired composition varies depending on the intended use of the aqueous solution or the composition of a coexisting substance, however, for example, the concentration of the thermoresponsive polymer in the aqueous solution can be appropriately determined from the range of from 0.001 to 10% by weight.

The upper critical solution temperature (UCST) of the thermoresponsive particle as used herein refers to a temperature when an aqueous dispersion of the thermoresponsive particle ontaining a thermoresponsive particle is prepared to have a desired composition in a clear (dispersed) state, if necessary by heating, subsequently, the temperature of the resulting aqueous dispersion is lowered at a rate of 1° C. per minute, and the visible light transmittance of the aqueous dispersion becomes 50% (a state in which the thermoresponsive particles aggregate) of the value in the clear state.

The thermoresponsive particle as used herein refers to a particle which shows a UCST in the above-mentioned state of an aqueous dispersion. The thermoresponsive particles aggregate from an aqueous dispersion at the UCST or less, and disperse at a temperature higher than the UCST. It is preferred that a difference between a temperature at which the thermoresponsive particles disperse and the UCST is smaller, and thermoresponsive particles that disperse in an aqueous dispersion at a temperature ranging from the UCST to a temperature higher than the UCST by 10° C. is preferred, and thermoresponsive particles that disperse in an aqueous dispersion at a temperature ranging from the UCST to a temperature higher than the UCST by 5° C. is more preferred.

The composition of the aqueous dispersion of the thermoresponsive particle as used herein refers to the total components contained in the aqueous dispersion including the thermoresponsive particle and water, and a ratio of the components. This is because the value of UCST may be changed due to an effect of a coexisting substance contained in the aqueous dispersion. The above-mentioned desired composition varies depending on the intended use of the aqueous dispersion or the composition of a coexisting substance, however, for example, the concentration of the thermoresponsive particle in the aqueous dispersion can be appropriately determined from the range of from 0.001 to 10% by weight.

In the invention, when in the aqueous solution of the thermoresponsive polymer and the aqueous dispersion of the thermoresponsive particle, the content by percentage of the thermoresponsive polymer in the aqueous solution and the content by percentage of the thermoresponsive particle in the aqueous dispersion are the same and also the compositions of the other components such as coexisting substances are the same, the UCST of the aqueous dispersion of the thermoresponsive particle of the above-mentioned composition generally falls within the range from the UCST of the aqueous solution of the thermoresponsive polymer of the above-mentioned composition to a temperature higher than the UCST of the aqueous solution of the thermoresponsive polymer of the above-mentioned composition by 5° C. In the invention, by utilizing this fact, the UCST of either one of an aqueous dispersion of the thermoresponsive particle of a certain composition and an aqueous solution of the thermoresponsive polymer of the same composition as that of the aqueous dispersion can be determined based the UCST of the other one as an approximate value.

According to the invention, an aqueous solution of the thermoresponsive polymer and an aqueous dispersion of the thermoresponsive particle, which show a UCST and are capable of maintaining a dissolved state and a dispersed state, respectively, even if they are stored for a long period of time at a temperature at which a ligand such as an antibody or an antigen is not inactivated can be obtained.

Further, according to the method of the invention, even if a thermoresponsive polymer showing a given UCST in a state of an aqueous solution and a thermoresponsive particle modified with the polymer in a state of an aqueous dispersion are stored at a temperature less than the UCST for a long period of time, the thermoresponsive polymer showing a UCST and the thermoresponsive particle modified with the polymer can be stored for a long period of time while maintaining a state of an aqueous solution and a state of an aqueous dispersion, respectively. In particular, in the case where the thermoresponsive particle has a ligand such as an antibody or an antigen, the thermoresponsive particle can be favorably dispersed in an aqueous dispersion without inactivating the ligand.

DESCRIPTION OF THE PREFERRED EMBODIMENTS

Hereinafter, the present invention will be described in detail.

In the invention, an aqueous solution of the thermoresponsive polymer containing a thermoresponsive polymer is stored at a storage temperature less than the UCST of the thermoresponsive polymer under a condition in which this aqueous solution is used. In the invention, the UCST is lowered to a temperature less than the storage temperature by adding an upper critical solution temperature lowering agent (a UCST lowering agent) which lowers the UCST to the aqueous solution in an amount so that the UCST is lowered to a temperature less than the storage temperature, and the thermoresponsive polymer in a state of an aqueous solution is stored.

Further, in the invention, an aqueous dispersion of the thermoresponsive particle containing a thermoresponsive particle having a carrier particle and a thermoresponsive polymer carried on the carrier particle is stored at a storage temperature less than the UCST of the thermoresponsive particle due to the thermoresponsive polymer under a condition in which this aqueous dispersion is used. In the invention, the UCST is lowered to a temperature less than the storage temperature by adding a UCST lowering agent which lowers the UCST to the aqueous dispersion in an amount so that the UCST is lowered to a temperature less than the storage temperature, and the thermoresponsive particle in a state of an aqueous dispersion is stored.

As the thermoresponsive polymer, a polymer showing a UCST at a composition of the aqueous solution of the thermoresponsive polymer can be used. As the thermoresponsive polymer, one type of polymer, or two or more types of polymers may be used.

Further, in the above-mentioned thermoresponsive polymer, when an aqueous solution thereof is stored in such a state that the thermoresponsive polymer aggregates for a long period of time (for example, for 1 month), a polymer which does not completely dissolve in water even at a temperature exceeding the UCST is included. In the invention, however, such a thermoresponsive polymer can be stored in water in a stable and favorable state for a long period of time.

As the thermoresponsive polymer, a polymer formed from at least one type of monomer selected from the group consisting of acryloylglycinamide, acryloylnipecotamide and acryloylasparaginamide can be used. Further, it may be a copolymer formed from at least two types of monomers of these. As a monomer that can preferably be copolymerized with any of these monomers, acrylamide, acetylacrylamide, biotinol acrylate, N-biotinyl-N'-methacryloyltrimethyleneamide, acryloylsarcosinamide, methacryloylsarcosinamide, acryloylmethyluracil, acryloylglutaminamide and the like can be exemplified. When such a copolymer is selected as the thermoresponsive polymer, the UCST can be controlled by changing the type of monomer to be copolymerized or a ratio thereof, therefore, it is possible to design a polymer in accordance with the operating temperature of the aqueous solution or aqueous dispersion.

In particular, a polymer obtained by polymerization or copolymerization of a monomer containing as a principal component, one or both of N-acryloylglycinamide and N-acryloylasparaginamide is preferred because it can control the UCST in the range of from about 0° C. to about 30° C. by changing the ratio of copolymerization, and therefore can preferably be used for the thermoresponsive particle according to the invention on which the thermoresponsive polymer has been immobilized. Further, a polymer obtained by polymerization or copolymerization of a monomer containing 90% by mole or more in total of one or both of N-acryloylglycinamide and N-acryloylasparaginamide is more preferred.

The molecular weight of the thermoresponsive polymer is not particularly limited, however, the weight average molecular weight thereof is preferably from 1,000 to 1,000,000, and more preferably from 5,000 to 500,000. The weight average molecular weight can be determined by gel permeation chromatography.

The thermoresponsive polymer can be obtained by dissolving the above-mentioned monomer in an organic solvent or water, replacing the system with an inert gas, raising the temperature to a polymerization temperature, adding a polymerization initiator, for example, an azo-based polymerization initiator such as azobisisobutylonitrile or a peroxide such as benzoyl peroxide in the case of an organic solvent, a polymerization initiator such as ammonium persulfate, potassium persulfate, 2,2'-azobis(2-amidinopropane)dihydrochloride or 4,4'-azobis(4-cyanovalerate) in the case of an aqueous system, and continuing heating with stirring. Thereafter, purification of the thus obtained thermoresponsive polymer can also be carried out by a method in which reprecipitation is carried out in a poor solvent and an aggregated polymer is filtered, or a method in which the resulting reaction mixture is cooled to the UCST or less, and the resulting thermoresponsive polymer is aggregated and separated by centrifugation or the like.

The thermoresponsive particle has a carrier particle and the thermoresponsive polymer carried on this carrier particle. As the carrier particle, a particulate carrier that can be coated with a polymer can be used. Further, the carrier particle is preferably insoluble in a solvent to be used, i.e., water or an organic solvent, and inorganic polymeric compounds such as glass beads, silica gel and silicone, synthetic organic polymeric compounds such as polyvinyl chloride, polystyrene, styrene-divinylbenzene copolymers, styrene-maleic anhydride copolymers, nylon, polyvinyl alcohol, polyacrylamide, polyacrylonitrile, polypropylene and polymethylene methacrylate, organic compounds composed of a polysaccharide such as cellulose, agarose or dextrin, and further organic-organic and organic-inorganic composites and the like obtained by combining any of these can be exemplified. These compounds may be those obtained by introducing a functional group such as an amino group, an aminoalkyl group, a carboxyl group, an acyl group or a hydroxy group.

In the case where the carrier particle is a magnetic particle, after the thermoresponsive particles are aggregated by lowering the temperature of the aqueous dispersion of the thermoresponsive particle to the UCST or less, the aggregated thermoresponsive particles can be easily collected by a magnetic force, and thus it can be employed in an easy collection or purification of a target substance in an aqueous dispersion, therefore it is preferred. Further, in the case where the carrier particle is a magnetic particle, when the particle size of the thermoresponsive particle is from 50 to 200 nm, only aggregated thermoresponsive particles in an aqueous dispersion can be collected by a magnetic force, therefore it is preferred.

Such a magnetic particle can be produced by the method disclosed in, for example, JP-A-2002-517085. That is, the method is a method in which an aqueous solution containing an iron(II) compound, or an iron(II) compound and a metal (II) compound is placed under an oxidative condition necessary for forming a magnetic oxide, the pH of the solution is maintained at 7 or higher, whereby an iron oxide or ferrite magnetic nanoparticle is formed. Further, the magnetic particle can also be produced by mixing an aqueous solution containing a metal(II) compound and an aqueous solution containing iron(III) under an alkaline condition.

Alternatively, the magnetic particle may be composed of a magnetic particle and an organic compound for covering the magnetic particle. As the organic compound for covering such a magnetic particle, for example, a polyhydric alcohol can be used, and such a magnetic particle can also be produced from, for example, a polyhydric alcohol and magnetite. As the polyhydric alcohol, any can be used without particular limitation so long as it is an alcohol structure which has at least two hydroxy groups as its constituent units and can bind to an iron ion. Examples of the polyhydric alcohol include dextran, polyvinyl alcohol, mannitol, sorbitol, cyclodextrin and the like. Such a magnetic particle in the form of being coated with an organic compound such as a polyhydric alcohol can be obtained by, for example, the method for producing a magnetic particle using dextran as disclosed in Patent document 3. Further, a compound which has an epoxy group like a glycidyl methacrylate polymer and is capable of forming a polyhydric alcohol structure after ring opening can also be used as a raw material when a magnetic particle in the form of being coated with an organic compound is produced.

The thus prepared magnetic particle using a polyhydric alcohol preferably has an average particle size of 0.9 nm or more and less than 1,000 nm so as to have a favorable dispersibility. In particular, in the case where the magnetic particle further has a ligand on its surface, in order to increase the reaction rate between the ligand and a target substance, it preferably has an average particle size of 200 nm or less, and in order to increase the collection rate by a magnetic force, it preferably has an average particle size of 50 nm or more.

The binding between the carrier particle and the thermoresponsive polymer in the thermoresponsive particle can be achieved by a method well known in this technical field (for example, a method described in ADV. Polym. Sci., vol. 4, p. 111, 1965, or J. Polymer Sci., Part-A, 3, p. 1031, 1965) such as a method in which binding is achieved through a reactive functional group, or a method in which a polymerizable unsaturated bond is introduced into an active hydrogen of the polyhydric alcohol in the magnetic particle or the polyhydric alcohol, and graft polymerization is carried out between the thermoresponsive polymer and the magnetic particle. In this way, the thermoresponsive particle can be obtained.

The thermoresponsive particle may further have a ligand carried on the thermoresponsive polymer. The ligand is a substance specifically and mutually adsorbing various biomolecules such as proteins or microorganisms. Examples of the ligand include biotin, avidin, glutathione, lectin, an antibody and the like. The carrying of the ligand on the thermoresponsive polymer can be achieved by, for example, the method described in Patent document 3 or a commonly used method.

The storage temperature of the aqueous solution of the thermoresponsive polymer or the aqueous dispersion of the thermoresponsive particle may be a temperature less than the UCST. The storage temperature can be determined according to the intended use of the thermoresponsive polymer or thermoresponsive particle or the condition such as the type of ligand of the thermoresponsive particle. For example, in the case where the intended use is separation of a biomolecule or a microorganism from a biological sample or purification thereof, or the case where the thermoresponsive particle has a ligand, the storage temperature is preferably from 2 to 6° C. from the viewpoint of preventing deterioration of such a target substance or the ligand due to temperature.

In the invention, the UCST is lowered to a temperature less than the storage temperature by incorporating a UCST lowering agent which lowers the UCST in the aqueous solution or aqueous dispersion in an amount so that the UCST is lowered to a temperature less than the storage temperature. As the UCST lowering agent, a water-soluble salt or a water-soluble organic solvent can be used. The UCST lowering agent may be any salt or organic solvent so long as it can lower the UCST, and the type of UCST lowering agent or the content thereof can be determined according to the condition such as the type of thermoresponsive polymer or the storage temperature.

For example, in the case where the thermoresponsive polymer is a polymer obtained by polymerization or copolymerization of a monomer containing, as a principal component, one or both of N-acryloylglycinamide and N-acryloylasparaginamide, as the UCST lowering agent, sodium chloride, sodium nitrate, magnesium sulfate, lithium chloride, dimethyl sulfoxide or the like can be used.

In particular, sodium chloride, sodium nitrate, magnesium sulfate and lithium chloride can greatly lower the UCST, therefore, they can preferably be used. Such a salt solution may be neutralized with an acid or an alkali, or may be dissolved in a buffer or the like for use.

The content of the UCST lowering agent may be an amount capable of lowering the UCST of the aqueous solution or aqueous dispersion to a temperature less than the storage temperature, and can be determined according to the condition such as the type of thermoresponsive polymer, the storage temperature, or the type of UCST lowering agent.

In general, the salt concentration is preferably from 300 mM or more and 5 M or less. In order to lower the UCST to a temperature greatly lower than the storage temperature or to eliminate the UCST thereby further preventing aggregation of the thermoresponsive polymer or thermoresponsive particles, the salt concentration is preferably 450 mM or more. Further, from the viewpoint of stability of the ligand such as a protein, the salt concentration is preferably 2 M or less.

For example, in the case where the thermoresponsive polymer is a polymer obtained by polymerization or copolymerization of a monomer containing, as a principal component, one or both of N-acryloylglycinamide and N-acryloylasparaginamide, the storage temperature is in the range of from 2 to 6° C., and the UCST lowering agent is sodium chloride, sodium nitrate, magnesium sulfate or lithium chloride, the UCST lowering agent is preferably incorporated in an amount of 1,000 mM or more in the aqueous solution or aqueous dispersion, and further, in the case where the UCST lowering agent is sodium chloride, sodium nitrate or magnesium sulfate, the UCST lowering agent is preferably incorporated in an amount of 450 mM or more in the aqueous solution or aqueous dispersion.

Further, for example, in the case where the thermoresponsive polymer is a polymer obtained by polymerization or copolymerization of a monomer containing, as a principal component, one or both of N-acryloylglycinamide and N-acryloylasparaginamide, the storage temperature is in the range of from 2 to 6° C., and the UCST lowering agent is dimethyl sulfoxide, the UCST lowering agent is preferably incorporated in an amount of 60% by volume or more in the aqueous solution or aqueous dispersion, and from the viewpoint of the stability of the ligand such as a protein, it is preferably 90% by volume or less.

As the aqueous solution of the thermoresponsive polymer according to the invention, more specifically, an aqueous solution of the thermoresponsive polymer containing a polymer obtained by polymerization or copolymerization of a monomer containing 90% by mole or more in total of one or both of N-acryloylglycinamide and N-acryloylasparaginamide; water; and 450 mM or more of sodium chloride, 450 mM or more of sodium nitrate, 450 mM or more of magnesium sulfate, 1,000 mM or more of lithium chloride or 60% by volume or more of dimethyl sulfoxide can be exemplified.

Further, as the aqueous dispersion of the thermoresponsive particle according to the invention, more specifically, an aqueous dispersion of the thermoresponsive particle containing a thermoresponsive particle having a carrier particle and a polymer obtained by polymerization or copolymerization of a monomer containing 90% by mole or more in total of one or both of N-acryloylglycinamide and N-acryloylasparaginamide and carried on the carrier particle; water; and 450 mM or more of sodium chloride, 450 mM or more of sodium nitrate, 450 mM or more of magnesium sulfate, 1,000 mM or more of lithium chloride or 60% by volume or more of dimethyl sulfoxide can be exemplified.

It is preferred that the carrier particle is a magnetic particle. It is more preferred that the particle size of the thermoresponsive particle is from 50 to 200 nm. It is further more preferred that the thermoresponsive particle further has a ligand carried on the polymer obtained by polymerization or copolymerization of a monomer containing 90% by mole or more in total of one or both of N-acryloylglycinamide and N-acryloylasparaginamide.

Further, it is preferred that in the aqueous solution of the thermoresponsive polymer and aqueous dispersion of the thermoresponsive particle, the concentration of sodium chloride, sodium nitrate, magnesium sulfate or lithium chloride is 5 M or less.

In the aqueous solution of the thermoresponsive polymer and aqueous dispersion of the thermoresponsive particle, the thermoresponsive polymer in a dissolved state and the thermoresponsive particle in a dispersed state is/are stored at a storage temperature less than the UCST, respectively. Therefore, in the case where the thermoresponsive polymer in a state of an aqueous solution or the thermoresponsive particle in a state of an aqueous dispersion is stored at the storage temperature for a long period of time, even if this aqueous solution or aqueous dispersion is heated to the UCST, the deterioration of solubility or dispersibility due to long-term storage (for example, the thermoresponsive polymer does not completely dissolve, or the thermoresponsive particle does not completely disperse) can be prevented.

In the present invention, in the aqueous solution of the thermoresponsive polymer or aqueous dispersion of the thermoresponsive particle, further an additive can be added within a range that does not adversely affect the reduction of the UCST by the UCST lowering agent, and the solubility of the thermoresponsive polymer or the dispersibility of the thermoresponsive particle. Such an additive can be determined according to the intended use of the thermoresponsive polymer or thermoresponsive particle. For example, the intended use thereof is separation or purification of a biological sample, examples of the additive include an acid, an alkali, a pH buffer solution, a water-soluble organic solvent and the like.

In this connection, the aqueous solution of the thermoresponsive polymer or aqueous dispersion of the thermoresponsive particle according to the invention stored at the storage temperature may be used as such or after heating it to a temperature higher than the UCST. In order to decrease the concentration of the UCST lowering agent to return the UCST to a temperature higher than the storage temperature, it may be diluted with water such as purified water for use. In the case where the aqueous dispersion of the thermoresponsive particle having a magnetic particle as the carrier particle is diluted with water, the diluted aqueous dispersion is cooled to the UCST or less again to aggregate the thermoresponsive particles, the aggregated thermoresponsive particles are collected using a magnetic force generating unit such as a magnet, the remaining salt or solvent is removed, and replacement with a necessary buffer solution or the like can also be performed.

The invention has a feature that the UCST of a solution of a polymer having a UCST or a dispersion of a particle modified with a polymer having a UCST is lowered to a temperature less than a storage temperature, or the UCST is eliminated during storage. The UCST is measured in an aqueous solution, however, the UCST can be measured at a temperature the freezing point or more of the aqueous solution and the boiling point or less thereof at which the aqueous solution is in a liquid state. Accordingly, in the case where the UCST is the freezing point of the aqueous solution or lower or the boiling point of the aqueous solution or higher, an apparent UCST disappears. In the invention, such a condition in which the UCST disappears can also be preferably used.

EXAMPLES

Hereinafter, the present invention will be described in further detail with reference to Examples, however, the invention is not limited to these Examples.

Example 1

In a 200 mL three-neck flask equipped with a nitrogen gas introduction device, a thermometer and a stirrer, 4 g of N-acryloylglycinamide, 2 g of N-acryloylasparaginamide and 100 mL of Milli-Q water (ultrapure water obtained by purification using Direct-Q manufactured by Millipore) were placed, and nitrogen was bubbled through the solution for 30 minutes to remove dissolved oxygen therein. To the solution, 0.6 g of ammonium peroxodisulfate and 0.4 mL of N,N'-methylenebisacrylamide were added, and a reaction was allowed to proceed at room temperature for 5 hours. After completion of the reaction, purification was carried out using a dialysis membrane having a molecular weight cut off of 1,000. The thus obtained purified substance was lyophilized, whereby an N-acryloylglycinamide-N-acryloylasparaginamide copolymer (hereinafter, referred to as "thermoresponsive polymer 1") was obtained. The yield was 3.5 g.

The thermoresponsive polymer 1 was dissolved at 0.1% by weight in any of sodium chloride aqueous solutions prepared at various sodium chloride concentrations. The UCST of these aqueous solutions was measured. The measurement results are shown in FIG. 1. As shown in FIG. 1, it was found that as the concentration of sodium chloride in the aqueous solution increases, the UCST decreases, and when the concentration of sodium chloride exceeds 350 mM, the UCST becomes 4° C. or lower. That is, it was found that in the case where the aqueous solution of the thermoresponsive polymer 1 is stored at 4° C., by setting the concentration of sodium chloride to 350 mM or more, the thermoresponsive polymer 1 can be stored in a transparent state without causing aggregation thereof in the aqueous solution.

By using the thermoresponsive polymer 1, an aqueous solution in which the thermoresponsive polymer 1 was dissolved at 0.1% by weight in a 600 mM sodium chloride aqueous solution was prepared at room temperature. The appearance of the aqueous solution at the time of preparation was transparent. The thus prepared aqueous solution was stored in a refrigerator at 4° C. for one month, however, the aqueous solution remained transparent. This aqueous solution was diluted to 4 times with purified water, whereby the concentration of sodium chloride was made 150 mM. When the diluted aqueous solution was cooled with ice water, the thermoresponsive polymer 1 aggregated, and then, the aqueous solution was heated to 10° C. or higher, it became a transparent aqueous solution again.

Comparative Example 1

By using the thermoresponsive polymer 1 obtained in Example 1, an aqueous solution in which the thermoresponsive polymer 1 was dissolved at 0.1% by weight in a 150 mM sodium chloride aqueous solution was prepared at room temperature. The appearance of the aqueous solution at the time of preparation was transparent. When this aqueous solution was cooled to 4° C., the thermoresponsive polymer 1 aggregated. Further, after it was stored in a refrigerator at 4° C. for one month, the thermoresponsive polymer 1 remained aggregated and deposited. Even when this aqueous solution was diluted to 4 times with a 150 mM sodium chloride aqueous solution and heated to 10° C. or higher, the thermoresponsive polymer 1 did not completely dissolve and the solution was turbid.

From these results, the thermoresponsive polymer 1 stored at 4° C. in a 600 mM sodium chloride aqueous solution could favorably dissolve again in the aqueous solution even when the aqueous solution was diluted to make the concentration of sodium chloride 150 mM. On the other hand, the thermoresponsive polymer 1 stored at 4° C. in a 150 mM sodium chloride aqueous solution did not completely dissolve, and even when the temperature of the aqueous solution was returned to a temperature not lower than the UCST, the aqueous solution was turbid.

Example 2

By using the thermoresponsive polymer 1 obtained in Example 1, aqueous solutions having various salt concentrations and solvent concentrations as shown in Tables 1 and 2 were prepared at room temperature. Then, in the same manner as in Example 1, the stability of the polymer was examined by a method in which the aqueous solutions prepared at room temperature were stored at 4° C. for one month, and the salt concentration was adjusted to 150 mM or the solvent concentration was adjusted to 20% by volume, and then the aqueous solution was heated to 10° C. to redisperse the thermoresponsive polymer 1. In this connection, in the following Tables 1 and 2, "good" in the redispersibility indicates that the appearance of the aqueous solution when heated to 10° C. was transparent.

TABLE 1

| Type of salt | Salt concentration during storage (mM) | Appearance after storage | Redispersibility *1 |
|---|---|---|---|
| NaCl | 750 | Transparent | Good |
|  | 600 | Transparent | Good |
|  | 450 | Transparent | Good |

TABLE 1-continued

| Type of salt | Salt concentration during storage (mM) | Appearance after storage | Redispersibility *1 |
|---|---|---|---|
| | 300 | Turbid | Not completely dispersed |
| | 150 | Turbid | Not completely dispersed |
| LiCl | 1000 | Transparent | Good |
| | 900 | Turbid | Not completely dispersed |
| | 500 | Turbid | Not completely dispersed |
| NaNO$_3$ | 1000 | Transparent | Good |
| | 500 | Transparent | Good |
| | 450 | Transparent | Good |
| | 300 | Turbid | Not completely dispersed |
| | 150 | Turbid | Not completely dispersed |
| MgSO$_4$ | 1000 | Transparent | Good |
| | 500 | Transparent | Good |
| | 450 | Transparent | Good |
| | 300 | Turbid | Not completely dispersed |
| | 150 | Turbid | Not completely dispersed |

*1: Appearance when the aqueous solution was heated to 10° C. after the salt concentration was adjusted to 150 mM.

TABLE 2

| Type of solvent | Solvent concentration during storage (v/v %) | Appearance after storage | Redispersibility *2 |
|---|---|---|---|
| DMSO | 90 | Transparent | Good |
| | 60 | Transparent | Good |
| | 30 | Turbid | Not completely dispersed |
| | 15 | Turbid | Not completely dispersed |
| | 5 | Turbid | Not completely dispersed |

*2: Appearance when the aqueous solution was heated to 10° C. after the solvent concentration was adjusted to 20% by volume.

As shown in Tables 1 and 2, by adding a high concentration of a salt or a solvent to an aqueous solution to lower the UCST to a temperature less than the storage temperature, and storing the aqueous solution in a transparent and dispersed state, even after long-term storage at a low temperature, the thermoresponsive polymer in a state of having a favorable dispersibility in the aqueous solution thereby allowing the aqueous solution to have a transparent appearance could be obtained.

Example 3

By using 75 mg of N-acryloylglycinamide, 36 mg of N-acryloylasparaginamide and 0.7 mg of N-biotinyl-N'-methacryloyltrimethyleneamide, thermoresponsive magnetic particles 1 having a UCST of 7° C. were prepared by modifying a magnetite-dextran complex according to the method described in Patent document 3. More specifically, in a 50 mL three-neck flask, 75 mg of N-acryloylglycinamide, 36 mg of N-acryloylasparaginamide, 0.7 mg of N-biotinyl-N'-methacryloyltrimethyleneamide and 1 mL of an aqueous solution of 2% by weight of a magnetite-dextran complex (40 nm) were placed, and the final volume was made up to 20 mL with distilled water. After the solution was subjected to nitrogen replacement, 200 µL of a 0.2 M cerium (IV) diammonium nitrate solution was further added thereto, and a reaction was allowed to proceed with stirring for 2 hours, whereby the thermoresponsive magnetic particles 1 were obtained.

The above-mentioned magnetite-dextran complex was obtained as follows.

In a 100 mL flask, 3 mL of a mixed aqueous solution of ferric chloride hexahydrate (1.0 mol) and ferrous chloride tetrahydrate (0.5 mol) and 60 mL of an aqueous solution of 10% by weight of dextran (manufactured by Wako Pure Chemicals Industries, Ltd., molecular weight of 32,000 to 40,000), which is a polyhydric alcohol, were placed, and the mixed solution was stirred using a mechanical stirrer. After the temperature of this mixed solution was raised to 50° C., 5.0 mL of a 25% by weight ammonia solution was added dropwise thereto, and the mixed solution was stirred for about 1 hour. By this procedure, magnetic particles on which dextran was immobilized and which had an average particle size of about 40 nm were obtained.

The average particle size of the thus obtained thermoresponsive magnetic particles 1 was measured using a laser zeta potential meter, ELS-8000 manufactured by Otsuka Electronics Co. Ltd., and it was found to be about 110 nm.

By using the thermoresponsive magnetic particles 1 obtained above, an aqueous dispersion 1 in which the thermoresponsive magnetic particles 1 were dispersed at 1.6% by weight in a 600 mM sodium chloride aqueous solution was prepared at room temperature. The appearance of the aqueous dispersion 1 at the time of preparation was a transparent brown aqueous solution. This aqueous dispersion 1 was stored in a refrigerator at 4° C. for one month, however, the aqueous dispersion 1 remained transparent. When this aqueous dispersion 1 was diluted to 4 times with purified water, whereby the concentration of sodium chloride in the aqueous dispersion 1 was made 150 mM and the diluted aqueous dispersion 1 was cooled with ice water, the thermoresponsive magnetic particles 1 aggregated, and then the aqueous dispersion 1 was heated to 10° C. or higher, it became transparent again.

Comparative Example 2

By using the thermoresponsive magnetic particles 1 obtained in Example 3, an aqueous dispersion 2 in which the thermoresponsive magnetic particles 1 were dispersed at 0.4% by weight in a 150 mM sodium chloride aqueous solution was prepared at room temperature. The appearance of the aqueous dispersion 2 at the time of preparation was a transparent brown aqueous solution. When this aqueous dispersion 2 was cooled to 4° C., the thermoresponsive magnetic particles 1 aggregated and deposited. Further, after this aqueous dispersion was stored in a refrigerator at 4° C. for one month, the thermoresponsive magnetic particles 1 remained aggregated. Even when this aqueous dispersion 2 was diluted to 4 times with a 150 mM sodium chloride aqueous solution and heated to 10° C. or higher, the thermoresponsive magnetic particles 1 did not completely disperse and the aqueous dispersion 2 was turbid.

From these results, the thermoresponsive particles stored at 4° C. in a 600 mM sodium chloride aqueous solution were favorably dispersed in the aqueous dispersion even when the aqueous dispersion was diluted to make the concentration of sodium chloride 150 mM. On the other hand, the thermoresponsive particles stored at 4° C. in a 150 mM sodium chloride aqueous solution did not completely disperse and the aqueous dispersion was turbid even when the temperature of the aqueous dispersion was returned to a temperature not lower than the UCST.

Example 4

Into the thermoresponsive magnetic particles 1 obtained in Example 3, avidin was introduced using the method described in Patent document 3, whereby thermoresponsive magnetic particles 3 were obtained. More specifically, 50 µL of an aqueous solution of 0.1% by weight of the thermoresponsive magnetic particles 1 was placed in a 1.5 mL Eppendorf tube, and 50 µL of a 1 g/L avidin solution was added to the tube, and the solution was mixed at 40° C. for 20 minutes. Thereafter, the tube was cooled in ice water, and generated microparticles were allowed to aggregate, collected using a magnet and separated from the supernatant portion. To the aggregate portion, 200 μL of a buffer (20 mM Tris-HCl (pH 7.5), 150 mM NaCl, 0.05% Tween 20) was added, and the generated microparticles were heated and dispersed, and then cooled again to aggregate, whereby components contaminated in the aggregate cluster were washed away. This procedure was repeated 4 times, whereby the thermoresponsive magnetic particles 3 were obtained. The particle size of the thus obtained thermoresponsive magnetic particles 3 was measured in the same manner as in Example 3, and it was found to be 150 nm.

By using the thermoresponsive magnetic particles 3 obtained above, an aqueous dispersion 3 in which the thermoresponsive magnetic particles 3 were dispersed at 1.2% by weight in a 450 mM sodium chloride aqueous solution, an aqueous dispersion 4 in which the thermoresponsive magnetic particles 3 were dispersed at 1.6% by weight in a 600 mM sodium chloride aqueous solution, and an aqueous dispersion 5 in which the thermoresponsive magnetic particles 3 were dispersed at 2.0% by weight in a 750 mM sodium chloride aqueous solution were prepared, respectively. The appearances of these aqueous dispersions 3 to 5 at the time of preparation were transparent brown aqueous solutions, respectively. These aqueous dispersions 3 to 5 were stored in a refrigerator at 4° C. for one month, however, the aqueous dispersions 3 to 5 remained transparent. When the aqueous dispersion 3 was diluted to 3 times, the aqueous dispersion 4 was diluted to 4 times and the aqueous dispersion 5 was diluted to 5 times with purified water after storage, respectively, whereby the concentration of sodium chloride in the respective aqueous dispersions 3 to 5 was made 150 mM and the diluted aqueous dispersions 3 to 5 were cooled with ice water, the thermoresponsive magnetic particles 3 aggregated in the respective aqueous dispersions, and then the respective aqueous dispersions were heated to 10° C. or higher, they became transparent solutions again.

Further, an aqueous dispersion 6 in which the thermoresponsive magnetic particles 3 were dispersed at 1.2% by weight in an aqueous solution of 60% by volume of dimethyl sulfoxide, an aqueous dispersion 7 in which the thermoresponsive magnetic particles 3 were dispersed at 1.8% by weight in an aqueous solution of 90% by volume of dimethyl sulfoxide were prepared, respectively. These aqueous dispersions 6 and 7 were stored in a refrigerator at 4° C. for one month, however, these aqueous dispersions 6 and 7 remained transparent. When these aqueous dispersions 6 and 7 were diluted to 3 times and 4.5 times with purified water after storage, respectively, whereby the concentration of dimethyl sulfoxide in the respective aqueous dispersions was made 20% by volume and the diluted aqueous dispersions were cooled with ice water, the thermoresponsive magnetic particles 3 deposited in the respective aqueous dispersions, and then the respective aqueous dispersions were heated to 10° C. or higher, they became transparent solutions again.

Example 5

By using the aqueous dispersions 3 to 7 after stored at 4° C. for one month and adjusting the concentration of the thermoresponsive magnetic particles 3 in the aqueous dispersions 3 to 7 to 0.1% by weight, an experiment of collection of biotinylated anti-IgG was carried out according to the method described in Patent document 3. Further, an aqueous dispersion was freshly prepared under the same condition as that of the aqueous dispersion 3 and used in this collection experiment as an aqueous dispersion immediately after preparation. More specifically, 5 μL of an aqueous solution of 0.1% by weight of these microparticles was placed in a 1.5 mL Eppendorf tube, and 10 μL of a solution of 1 g/L biotinylated anti-IgG (trade name: Anti-IgG (Fc), Rabbit, Goat-poly, Biotin, manufactured by Rockland, Inc.) was added to the tube, and the solution was mixed at 40° C. for 20 minutes. Thereafter, the tube was cooled to 4° C., the resulting thermoresponsive magnetic particles 3 binding to the biotinylated anti-IgG were allowed to aggregate, and collected using a magnet, and impurities were removed. Thereafter, a buffer (20 mM Tris-HCl (pH 7.5), 150 mM NaCl, 0.05% Tween 20) was added thereto, and a procedure of aggregation and dispersion was repeated in the same manner, whereby the particles were washed and the biotinylated anti-IgG was collected.

Figure 2:
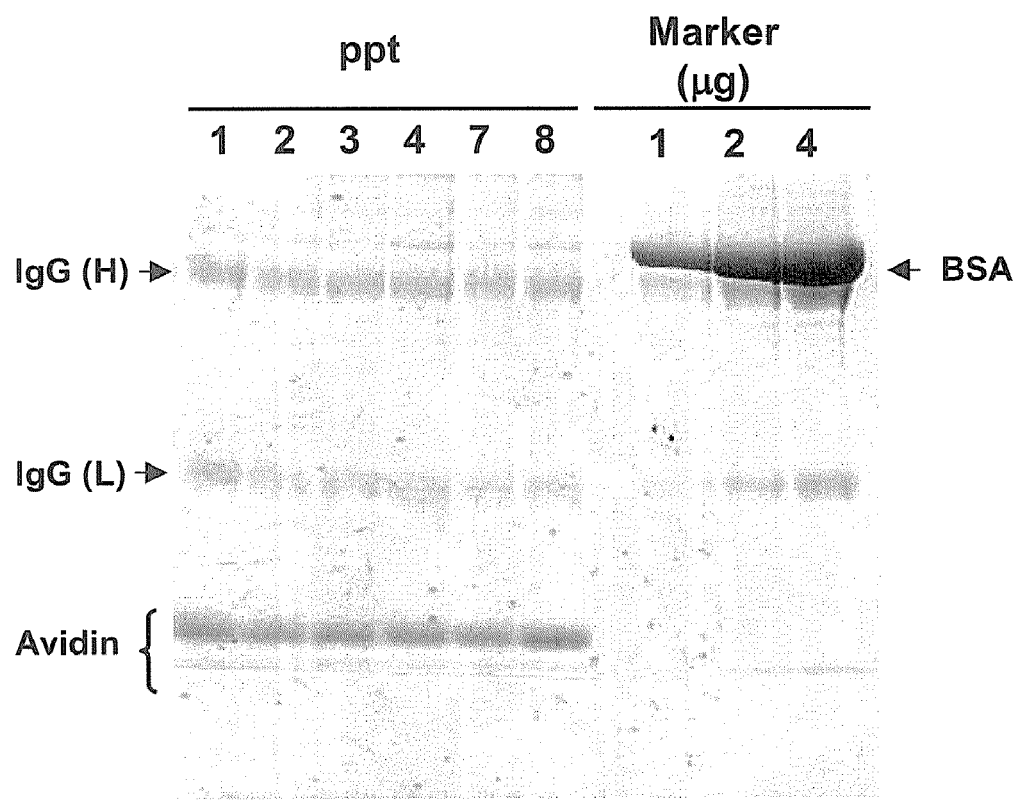
FIG. 2 is a photograph of an SDS-PAGE gel of proteins collected from the respective aqueous dispersions 3 to 7.

By using an extract of proteins bound to the thermoresponsive magnetic particles 3 collected from the respective aqueous dispersions, the proteins were separated by SDS polyacrylamide gel electrophoresis (SDS-PAGE), stained with a Coomassie Brilliant Blue staining solution and destained. The resulting bands are shown in FIG. 2. In FIG. 2, lane 1 shows bands of the aqueous dispersion 3, lane 2 shows bands of the aqueous dispersion 4, lane 3 shows bands of the aqueous dispersion 5, lane 4 shows bands of the aqueous dispersion 6, lane 5 shows bands of the aqueous dispersion 7, and lane 6 shows bands of the aqueous dispersion immediately after preparation. "IgG (L)" represents a light chain of the antibody, and "IgG (H)" represents a heavy chain of the antibody.

In FIG. 2, "Marker" represents commercially available biotinylated anti-IgG (trade name: Anti-IgG (Fc), Rabbit, Goat-poly, Biotin, manufactured by Rockland, Inc.), and the numerical values of the Marker lanes represent the amounts (μg) of the Marker. The marker lanes show bands obtained by performing the same procedure (SDS-PAGE) as described above using the respective amounts of the Marker. Further, "BSA" represents bovine serum albumin.

As apparent from the results, inactivation of avidin was not observed in any of the aqueous dispersions, and the activity immediately after preparation was maintained.

What is claimed is:

1. A method of storing a thermoresponsive polymer in a state of an aqueous solution, wherein the aqueous solution of the thermoresponsive polymer containing a thermoresponsive polymer is stored at a storage temperature, said storage temperature is less than an upper critical solution temperature, and the thermoresponsive polymer has said upper critical solution temperature according to a composition of the aqueous solution, the method comprises the step of adding to the aqueous solution an upper critical solution temperature lowering agent, which lowers the upper critical solution temperature, in an amount so that the upper critical solution temperature is lowered to less than the storage temperature, to lower the upper critical solution temperature to less than the storage temperature, wherein the storage temperature is from 2 to 6° C.

2. The storage method according to claim 1, wherein the thermoresponsive polymer is a polymer obtained by polymerization or copolymerization of a monomer containing one or both of N-acryloylglycinamide and N-acryloylasparaginamide as a principal component.

3. The storage method according to claim 2, wherein the thermoresponsive polymer is a polymer obtained by polymerization or copolymerization of a monomer containing 90% by mole or more in total of one or both of N-acryloylglycinamide and N-acryloylasparaginamide.

4. The storage method according to claim 1, wherein the upper critical solution temperature lowering agent is sodium chloride, sodium nitrate, magnesium sulfate, lithium chloride or dimethyl sulfoxide.

5. The storage method according to claim 4, wherein the upper critical solution temperature lowering agent is sodium chloride, sodium nitrate, magnesium sulfate or lithium chloride, and is added to the aqueous solution or aqueous dispersion at a concentration of 1,000 mM or more.

6. The storage method according to claim 4, wherein the upper critical solution temperature lowering agent is sodium chloride, sodium nitrate or magnesium sulfate, and is added to the aqueous solution or aqueous dispersion at a concentration of 450 mM or more.

7. The storage method according to claim 4, wherein the upper critical solution temperature lowering agent is dimethyl sulfoxide, and is added to the aqueous solution or aqueous dispersion at a concentration of 60% by volume or more.

* * * * *